United States Patent [19] [11] Patent Number: 4,778,248
Arzur et al. [45] Date of Patent: Oct. 18, 1988

| [54] | PRESSURIZED OPTICAL CABLE EQUIPPED TO DETECT AND LOCATE PRESSURE LOSSES THAT MIGHT AFFECT IT |
|---|---|
| [76] | Inventors: Bernard Arzur, 60, Residence Duroux, 22300 Lannion; Bernard Nonclercq, Kergomarà Troguery, 22450 La Roche-Derrien, both of France |
| [21] | Appl. No.: 715,163 |
| [22] | Filed: Mar. 22, 1985 |
| [30] | Foreign Application Priority Data |
| | Mar. 23, 1984 [FR] France .................. 84 04562 |
| [51] | Int. Cl.$^4$ .................. G02B 6/02; G02B 6/00; H01J 5/16; G01N 21/00 |
| [52] | U.S. Cl. .................. 350/96.29; 350/96.10; 350/96.23; 250/227; 356/73.1 |
| [58] | Field of Search ............ 350/96.10, 96.15, 96.23, 350/96.29, 96.30; 250/227, 231 R; 356/73.1 |
| [56] | References Cited |

U.S. PATENT DOCUMENTS

| 4,270,049 | 5/1981 | Tanaka et al. .................. 250/227 |
| 4,294,513 | 10/1981 | Nelson et al. .................. 350/96.15 X |
| 4,408,829 | 10/1983 | Fitzgerald, Jr. et al. ........ 250/227 X |
| 4,463,254 | 7/1984 | Asawa et al. .................. 250/231 R |
| 4,482,890 | 11/1984 | Forbes et al. .................. 250/227 X |
| 4,493,995 | 1/1985 | Adolfsson et al. .............. 250/231 R |

FOREIGN PATENT DOCUMENTS 1560124 1/1980 United Kingdom .............. 356/73.1

Primary Examiner—William L. Sikes
Assistant Examiner—Akm E. Ullah

[57] ABSTRACT

A pressurized optical cable equipped for the detection and location of losses of pressure that might affect it is equipped with a source for creating a light signal and injecting it into one of the extremities of an optical fiber of the cable, with pressure detectors situated at intervals along the cable, with modifiers associated with the detectors, which, in response to a reaction of the detector modify, at the point of the detection, the intensity of a light propagating in the optical fiber, and with an echometer for generating, at the extremity of the fiber, a representation of a light signal backscattered by this fiber when the injected signal propagates therein, for the purpose of detecting and locating a loss of pressure in the cable by detecting and identifying singularities in the representation, resulting from the action of the modifiers.

6 Claims, 5 Drawing Sheets

PRESSURIZED OPTICAL CABLE EQUIPPED TO DETECT AND LOCATE PRESSURE LOSSES THAT MIGHT AFFECT IT

BACKGROUND OF THE INVENTION

The present invention relates to a pressurized optical cable equipped for the detection and location of pressure losses that might affect it.

The technique of pressurizing telecommunication cables has been known for many years. This technique was first applied to cables consisting of electrical conductors. With the development of optical fiber techniques and their production, there is now a trend toward the application of this technique to optical cables.

One of the most common troubles encountered in the operation of a pressurized optical cable is the deterioration of the cable resulting in the entry of moisture into it. It is therefore necessary to have equipment capable of detecting and locating such trouble as quickly as possible so that action can be taken without delay to repair the cable.

It is known to monitor a pressurized cable by means of pressure transducers set at the same pressure as the cable and regularly distributed along the latter. Each transducer includes capsules which are deformable according to the pressure and which control the movement of the arm of a variable potentiometer incorporated in an electrical circuit to modify the intensity of a current passing through this circuit.

Such a system suffers from the disadvantage of requiring electrical conductors to detect and transmit the data relating to the pressurization of the cable, and such data then run the danger of electrical or magnetic interference.

It is the aim of the present invention to remedy this deficiency.

GENERAL DESCRIPTION OF THE INVENTION

The subject matter of the invention is a pressurized optical cable having a plurality of optical fibers, characterized by being provided with:
  source means for creating a light signal and injecting it into one of the extremities of an optical fiber of the cable, this signal then propagating in the fiber,
  pressure detectors disposed from place to place along the cable, each detector being designed to detect a change in the local pressure in the cable and to react to this pressure variation starting from a nominal value corresponding to a normal state of the cable,
  modification means associated with each detector, each modification means being adapted, in response to a reaction of the detector associated with it, to modify, at the point of detection, the intensity of a light propagating in the optical fiber, and
  echometry means provided to generate, at the end of the fiber, a representation of a light signal backscattered by this fiber when the signal injected is propagated therein,
so as to be able to detect and locate a loss of pressure in the cable, by detecting and locating the singularities of the said representation resulting from the action of the modification means.

Thus an assembly is obtained which is insensitive to any electrical or magnetic disturbance. Moreover, the invention renders unnecessary any additional conductor for testing the state of pressurization of the cable, because one of the optical fibers of the cable is used for this purpose.

According to one particular embodiment of the invention, each modification means is adapted, in response to the reaction of the detector associated with it, to provoke or cause a change in a mechanical stressing of the optical fiber.

According to another particular embodiment, the optical fiber has an interruption at each detection point, and each modification means includes a variable attenuator adapted for moving between the two surfaces of the fiber created by the interruption, in response to the reaction of the detector which is associated with it.

According to another particular embodiment, the source means include optical switching means adapted for injecting into the end of the optical fiber a light signal intended for testing the pressurization of the cable, or another light signal.

According to another particular embodiment, the injected light signal contains, in multiplexed form, a signal for testing the pressurization of the cable, and another signal, the backscattered signal thus including a portion corresponding to the signal intended for control, and the echometry means are provided in order to create the corresponding representation only at this portion.

Lastly, according to a preferred embodiment of the invention, in which the cable has splices, the pressure detectors are disposed at the location of these splices.

The invention will be more easily understood by reading the description that follows, of embodiments given only by way of indication and by no means to be understood as restrictive, in conjunction with the appended drawings, wherein.

Figure 1:
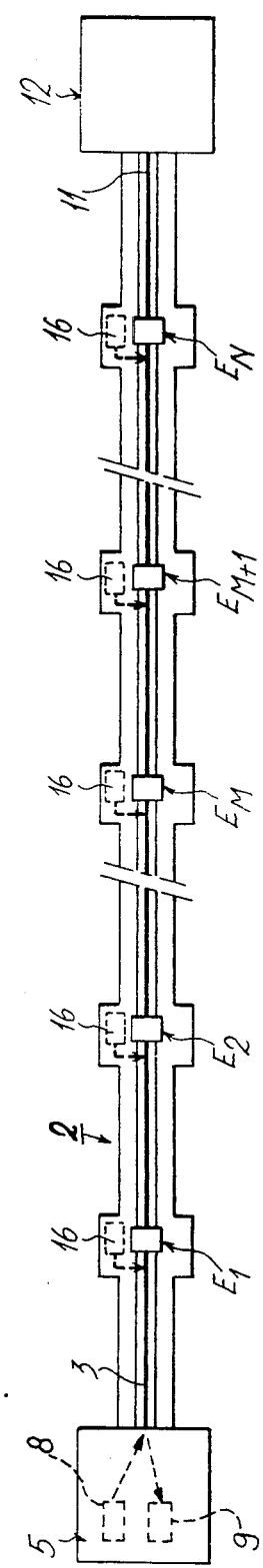
FIG. 1 is a diagrammatic view of a pressurized optical cable equipped in accordance with the invention.

In FIG. 1 a pressurized optical cable 2 in accordance with the invention is represented diagrammatically. This cable includes, in a known manner, a plurality of optical fibers only one of which, marked 3, is represented and used in the invention. The optical cable is provided at one of its extremities, 4, with an assembly 5 including (FIG. 2):
  means 6 for the pressurization of the optical cable,
  source means 8 for creating a light signal for testing the pressurization of the cable and injecting this signal into the corresponding end 7 of the optical fiber 3, and echometry means 9 designed to create at the considered end of fiber 3 a representation of a light signal backscattered by this fiber when the signal injected into it is propagated therein.

By way of example, the end 7 of fiber 3 is provided with a Y-coupler 10, the source means 8 are constituted by a laser diode, the light signal emitted by the latter being injected into one branch 10a of the coupler 10, and the echometry means are constituted by a reflectometer disposed so as to receive the portion of the backscattered signal issuing from the other branch 10b of coupler 10.

Of course, the other fibers of cable 2 are intended for transmitting information between the ends of the cable. As it will be seen in the description of FIGS. 6 to 8, fiber 3 can be assigned only temporarily to the inspection of the pressurization of the cable and is assigned the rest of the time to the transmission of data.

It is possible, if desired, to equip the other end 11 of the cable with another assembly 12 comparable to assembly 5, employing the source means and the echometry means of this other assembly only when the source means 8 and the echometry means 9 of assembly 5 are not operating.

Then, it is also assumed that only the pressurization means contained in assembly 5 are operating, the location of a possible loss-of-pressure point being less precise when the cable is pressurized through both its ends.

In the standard fashion, cable 2 includes a certain number of splices, E1, E2, . . . , Em+1, . . . , En, distributed here and there along the entire length of the cable. The cable measures, for example, about 40 kilometers in length, and the splices are located every two kilometers, the number n thus being on the order of 20.

At the location of each splice, there is disposed a pressure detector 16 that operates in the box containing this splice.

Figure 3:
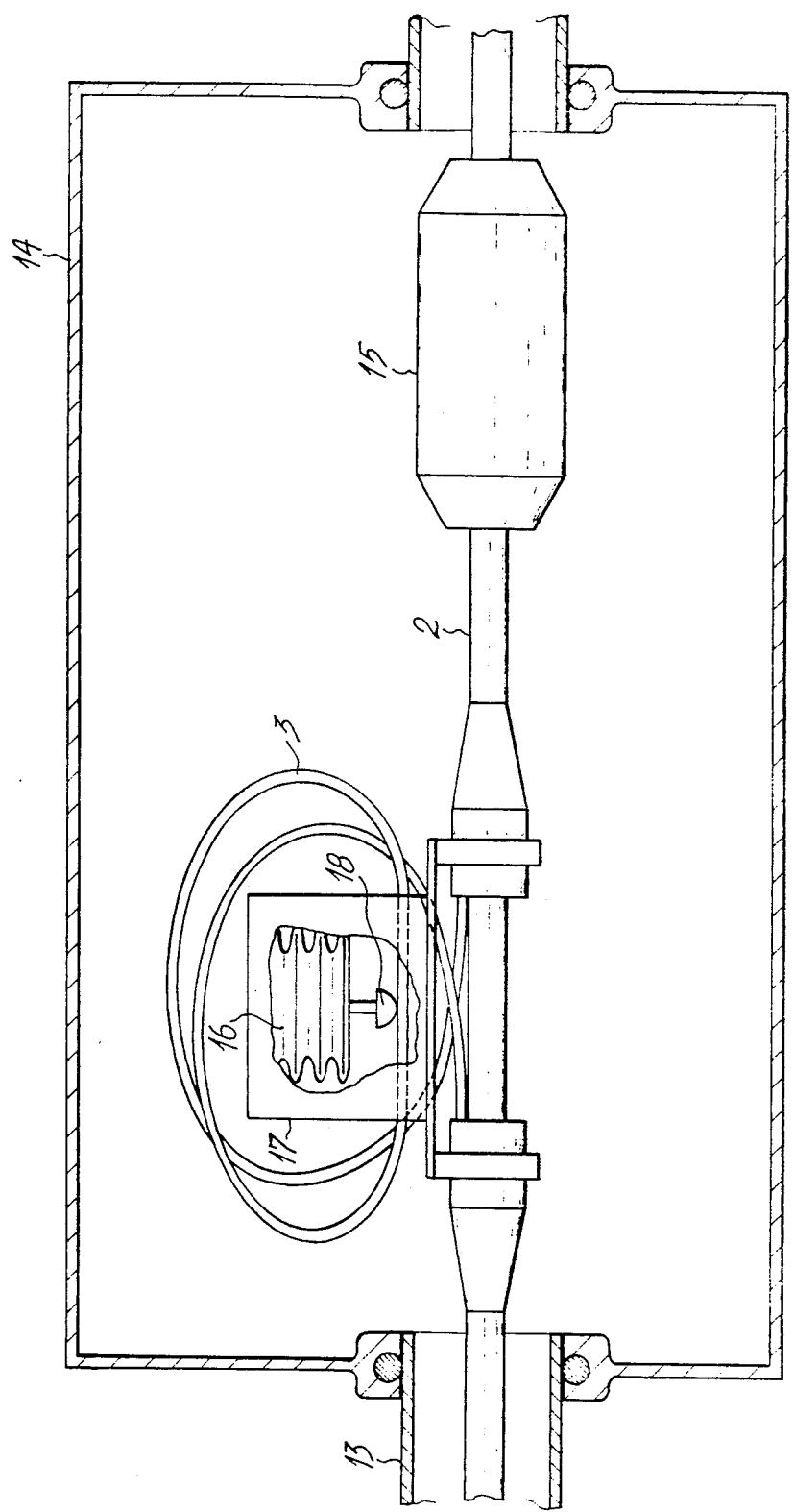
FIG. 3 is a diagrammatic view of a particular embodiment of the modification means with which the optical cable is equipped.

A first embodiment of the invention is diagrammatically represented in FIG. 3. The cable 2 is contained in a conduit 13 under pressure, provided with splice boxes of a number equal to the number of splices. In FIG. 3, such a splice box 14 containing a mass splice 15 has been shown. Of course, the conduit under pressure can contain a plurality of optical cables, each of them being then provided with splices contained in splice boxes 14.

In each splice box 14, the optical fiber 3 to be used for testing the pressurization of cable 2 is extracted from the sheath of the cable and forms for example two loops in the box in question. The pressure detector 16 corresponding to the splice box 14 is mounted in the latter on a support 17 itself affixed to the cable 2 and, if desired, to the splice box 14. The pressure detector 16 is of the mechanical plunger type. It consists, for example, of a pressure actuator of the kind sold by the Richard-Pekly company, and used in pressurized telephone cables to produce a change in the electrical resistance of a metallic couple, thus permitting detection of losses of pressure in the cable by measuring this change of resistance.

The optical fiber 3 is inserted into the support 17 such that the plunger 18 of the detector 16 can produce or vary the mechanical stress in one of the loops formed by the fiber, when the pressure decreases in the splice box.

Figure 2:
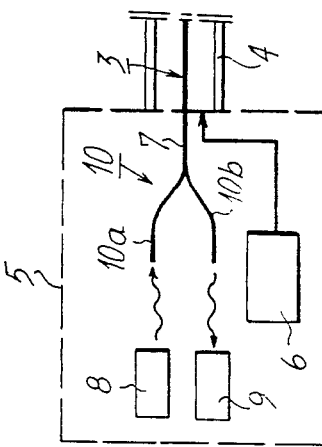
FIG. 2 is a diagrammatic view of one extremity of an optical fiber cable, into which a light signal is injected, and from which a light signal backscattered by this fiber is extracted and analyzed when the injected signal propagates in it.

The surveillance of the pressurization of the optical cable 2 is performed in the following manner:

The laser diode 8 and the reflectometer 9 are turned on. A test signal of light is then injected into the optical fiber 3 which backscatters a light signal of which a portion is captured by the reflectometer 9. When the cable is correctly pressurized, the reflectometer delivers a curve of the kind that is represented by the solid line in the diagram of FIG. 4, this curve translating the variations in the intensity A of the backscattered signal (plotted on the ordinates) according to the position L on the fiber 3, this position being plotted on the abscissas, the start of the abscissas being taken at the end 7 of the fiber nearest the pressurization means 6 (FIG. 2).

Figure 4:
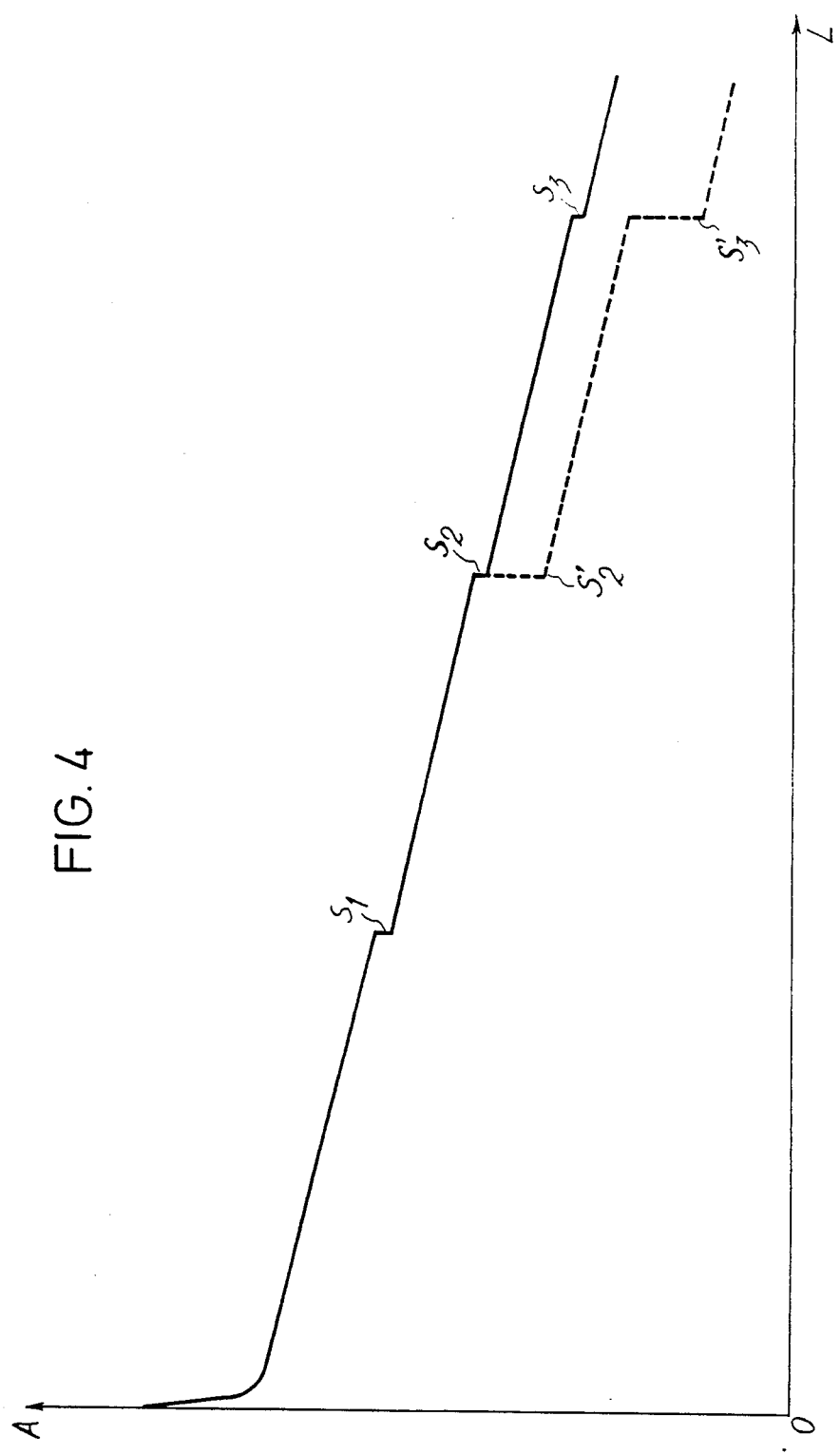
FIG. 4 is a graph containing curves obtained by echometry, which correspond, respectively, to a correct pressurization of the optical cable, and to a depressurization of the latter.

The intensity A is a diminishing function of position L, and singularities S1, S2, . . . , Sn are observed, corresponding respectively to the splices E1, E2, . . . , En, only the first three singularities S1, S2 and S3 being represented in FIG. 4.

In case of loss of pressure due to a leak, the plungers of the detectors situated downstream of the point where the leak occurs (the upstream direction being that facing the means of pressurization) press against the optical fiber 3, thus modifying the latter's transmission properties. The action of the plungers then manifests itself on the curve in FIG. 4 by the appearance of additional singularities at the points on the fiber where the detectors are placed, and, if such occur by the increase of the singularities corresponding to the splices which are downstream of the point where the leak occurs, the increases being greater as the distance increases downstream from this point, since the pressure then decreases all the more.

In the example represented in FIG. 4, the singularities S2, S3, . . . , Sn are replaced by greater singularities S'2, S'3, . . . , S'n, and the curve is shifted downwardly beginning from singularity S'2, this shift being represented in broken lines in FIG. 4. Upon seeing the change in the curve, a person in charge of supervising the optical cable then knows not only that a leak has occurred at a point on the cable, but also in what portion of the cable the leak has occurred—in the present case in the portion between the splices E1 and E2.

Figure 5:
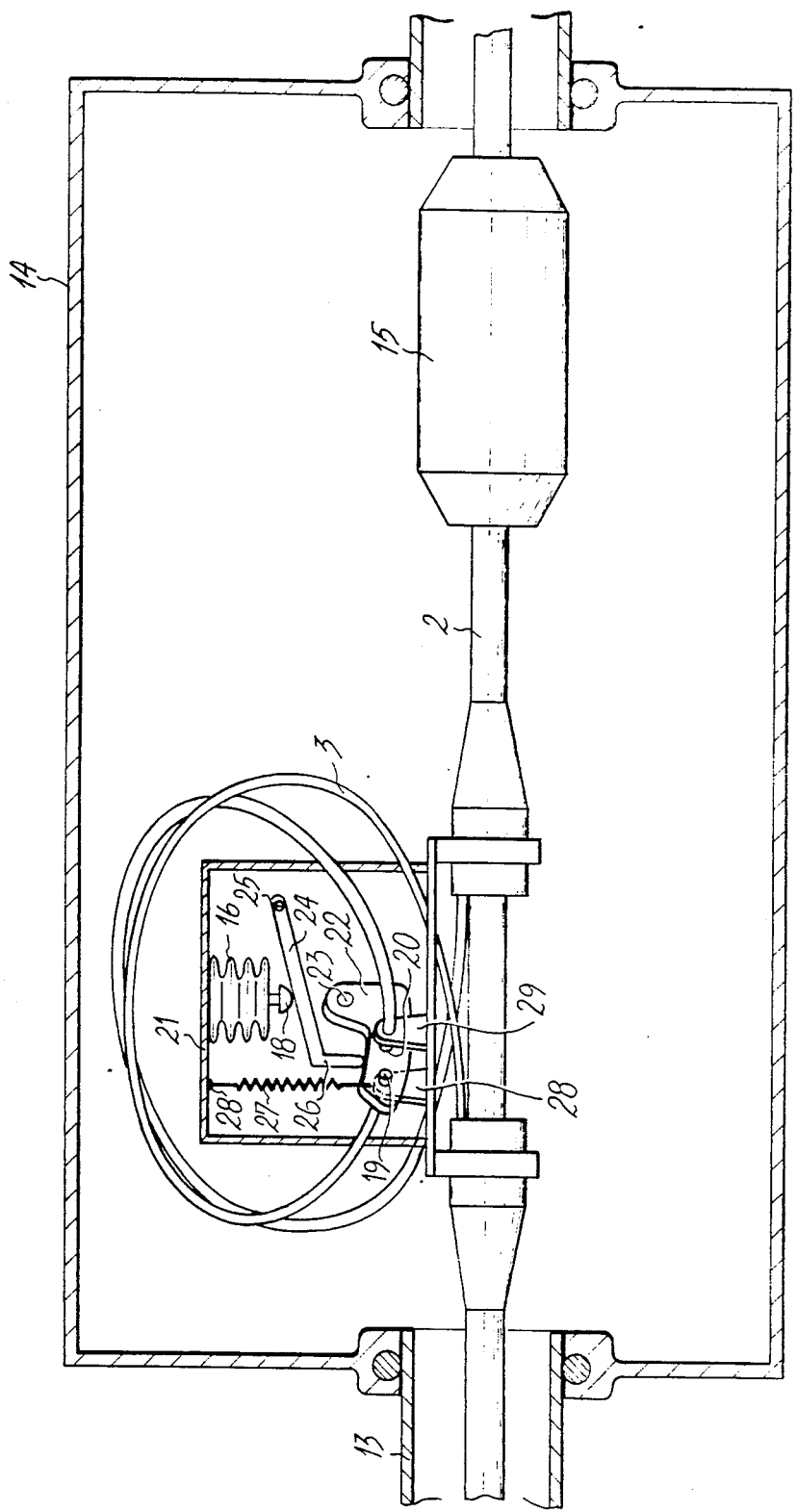
FIG. 5 is a diagrammatic view of another particular embodiment of the modification means with which the cable is equipped.

In FIG. 5, another particular embodiment of the invention has been represented, in which one of the loops of the optical fiber 3 has an interruption, exposing two end surfaces 19 and 20. The pressure detector is mounted on a support 21 which itself is affixed to the optical cable 2, and to the splice box 14 if desired. A commercially available variable light attenuator 22 having a density that varies from one end to the other is mounted rotatably on the support 21 on a pivot shaft 23. The detector 16 is designed to cause this attenuator to rotate when the pressure varies in the splice box 14. To do this, a lever 24 is interposed between the plunger 18 and the attenuator 22 such that the plunger 18 can press against the lever 24 when the pressure decreases in the splice box. The lever is pivotally mounted on the support 21 by means of a pivot shaft 25 situated at one of the ends of this lever. Its other end is provided with a plunger 26 adapted to press on the periphery of the variable light attenuator 22 when the pressure decreases in the splice box. Resilient means, consisting for example of a spring 27 whose one end 28 is affixed to the support 21 and whose other end is affixed to the periphery of the variable light attenuator 22, are provided for returning this light attenuator to its initial position when the plunger 26 of lever 24 no longer presses against it.

The fiber optic 3 is inserted into the support 21 such that its two parting surfaces are facing one another on either side of the variable light attenuator 22. The portions of he fiber optic 3 adjacent the surfaces 19 and 20 are held, for example, in supports 28 and 29 themselves affixed to the support 21 so as to obtain the desired position for the surfaces 19 and 20. The latter are obtained by cleavage of the fiber optic 3 such that a light signal emitted by the laser diode 5 and propagating in the fiber optic 3 to emerge from the parting surface 19 of the latter can pass back into the fiber 3 through the parting surface 20 after having passed through the variable light attenuator 22. The latter is mounted on its axis of rotation 23 such that a reduction of pressure in the splice box 14 results in a rotation of the variable light attenuator 22 in the direction of increasing opacity, thus causing a reduction of the intensity of the backscattered signal corresponding to the signal emitted by the laser diode once this backscattered signal has passed through the variable light attenuator.

A depressurization of the optical cable is then translated into the curve represented in FIG. 4 in a manner identical to that explained above, which again makes it possible to detect and locate this depressurization.

Of course, the pressure detectors could be disposed at points along the cable other than the splice boxes, but this would complicate the equipment of the cable and, particularly in the case of the embodiment represented in FIG. 5, which involves interruptions of the optical fiber 3, the attenuation of the light signals propagating in the latter would be increased thereby.

Figure 6:
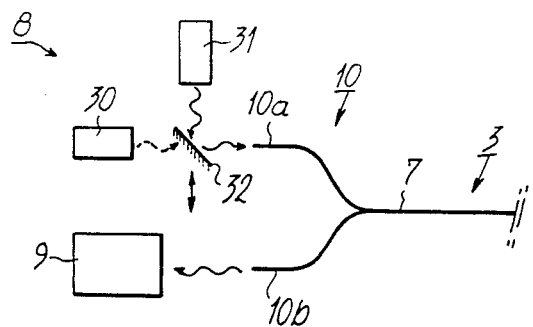
FIGS. 6 to 8 are diagrammatic views of particular embodiments of the invention wherein the optical fiber is used only part of the time for testing the state of pressurization of the optical cable.
Figure 7:
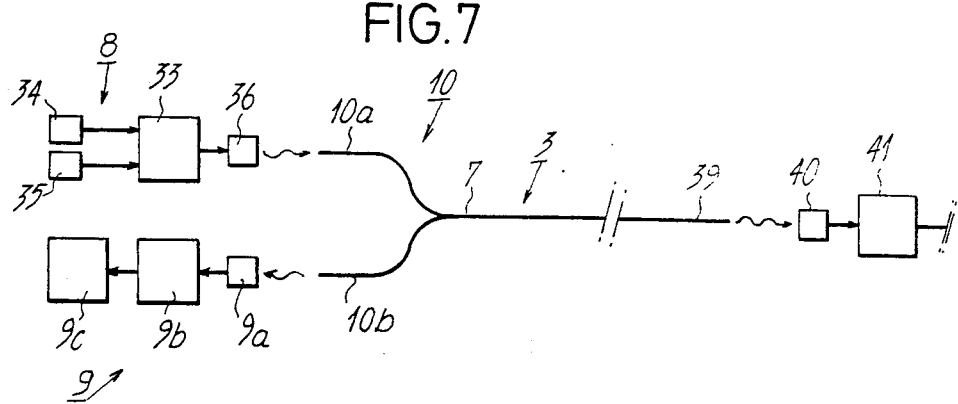
Figure 8:
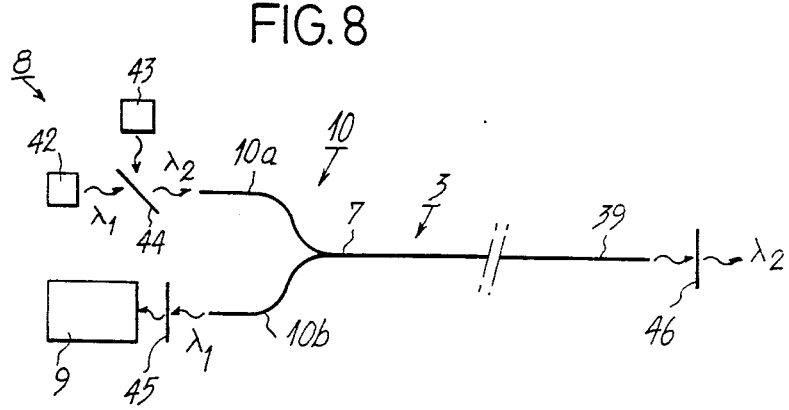

The optical fiber 3 can be devoted to monitoring the pressure in the cable either full-time or part-time. In the latter case, the testing is performed only at certain moments, the rest of the time being assigned to the transmission of data through the fiber 3. In FIGS. 6 to 8, other particular embodiments of the invention have been represented diagrammatically which permit this dual use of the fiber 3.

In the embodiment diagrammatically represented in FIG. 6, the source means 8 include: a light source 30, designed to emit a light signal for monitoring the pressurization of the optical cable; another light source 31 designed to emit a light signal carrying information which it is also desired to transmit via the fiber 3; and optical switching means 32 adapted to be in two states, one of the two states allowing the injection of the test light signal emitted by the source 30 into the optical fiber 3, through the mediation of the branch 10a of the coupler 10 provided for this purpose, and the other state permitting the injection of the information carrying signal emitted by the source 31 into the branch in question.

The optical switching means 32 consists, for example, of a planar mirror disposed at 45° to this branch 10a and shiftable between a retracted position and a switching position by means not represented. The source 30 is then, for example, disposed opposite the branch of the coupler under consideration so as to be able to inject the test signal into this branch when the planar mirror is retracted. The other source 31 is then disposed such that it emits a light beam perpendicular to this branch, and that this beam is returned in the direction of the latter by the mirror when it is in the switching position, the position in which it is interposed between the source 30 and the branch 10a of the coupler 10.

In the particular embodiment represented in FIG. 7, the dual use of the fiber optic 3 is obtained by means of time multiplexing. The source means 8 includes multiplexing means 33 of two inputs, one of the inputs receiving a test electrical signal produced recurrently and at given intervals of time by an emitter 34, the other input receiving an information-carrying electrical signal generated by another emitter 35. The output of the multiplexing means 33 is connected to an electro-optical converter 36 situated opposite the branch 10a of the coupler 10 which is intended for the injection of light signals into the optical fiber 3 so as to be able to inject into the latter a light signal corresponding to the signals respectively emitted by sources 34 and 35 and multiplexed by the multiplexing means 33. The latter are, for example, packet multiplexing means designed for providing the packets corresponding to the test signal with synchronizing words permitting their recognition.

The echometry means 9 include: a photoreceptor 9a which is disposed opposite branch 10b of coupler 10, and corresponds to these echometry means 9, and which is designed to convert the signal backscattered by the optical fiber 3, a portion of which emerges from the branch in question, into an electrical signal; demultiplexing means 9b whose input is connected to the output of the photoreceptor 9a and which is designed to reconstitute a homologous electrical signal from the portion of the backscattered signal corresponding to the test signal, this portion being recognized by means of the synchronization words, and lastly an echometry system 9c whose input is connected to the output of the demultiplexing means 9b so as to be able to obtain a curve of the kind that is represented in FIG. 4.

Of course, the detection of the information transmitted via the optical fiber 3 is performed at the other extremity 39 of the latter by means of a photodetector 40 associated with appropriate demultiplexing means 41.

In FIG. 8, another particular embodiment of the invention has been diagrammatically represented, which permits the dual use of the optical fiber 3 by means of wavelength multiplexing. The source means 8 include a light source 42 designed to emit a test light signal of a wavelength $\lambda_1$, and located opposite branch 10a of the coupler 10 corresponding to the source means 5, another light source 43 for emitting an information-carrying light signal of a wavelength $\lambda_2$, perpendicular to the branch in question, and a blade 44 transparent to the wavelength $\lambda_1$ and reflective for the wavelength $\lambda_2$, this blade being interposed between the source 42 and the branch in question and disposed so as to be able to reflect the signal emitted by the other source 43 in the direction of the branch in question. The echometry means 9 is constituted, for example, by a reflectometer equipped with an optical filter 45 designed to pass only the retrodiffused signal of wavelength $\lambda_1$ emerging from branch 10b associated with the reflectometer so as to enable the latter to obtain a curve of the kind represented in FIG. 4.

Of course, the other end 39 of the optical fiber 3 is provided with another optical filter 46 designed to pass only the signal of wavelength $\lambda_2$, so as to detect only the information-carrying signal at this other end.

The filters 45 and 46 can be made, for example, by depositing suitable multidielectric layers respectively at the end of branch 10b of the optical coupler associated with the reflectometer 9 and at the other end 39 of the optical fiber 3.

Instead of the Y-coupler discussed above, it would, of course, be possible to use any other means permitting the injection of a light beam into fiber 3 and the extraction of another light beam from this fiber, such as for example a semi-transparent mirror disposed opposite the end 7 of the fiber or created directly on this end by appropriate beveling, by means of suitable multi-dielectric layers.

We claim:

1. A pressurized optical cable, including a plurality of optical fibers, comprising: means for pressurizing the cable internally, source means for creating a light signal and for injecting same into an end of an optical fiber of the cable, to thereby propagate the signal in the fiber; a plurality of pressure detectors disposed at spaced locations inside the cable, each detector being designed to detect a variation in local pressure in the cable and to react to a pressure variation from a nominal value corresponding to a normal condition of the cable; a plurality of modification means respectively associated with said detectors, for modifying, in response to a reaction of the respective detector associated therewith, at the point of detection the intensity of light propagating in the optical fiber; and echometry means for generating at said end of the fiber, a representation of a light signal backscattered by said fiber when the injected signal propagates therein; to detect and locate loss of pressure in the cable, by detecting and referencing singularities of the representation resulting from action of the modification means.

2. A pressurized optical cable according to claim 1, wherein each modification means causes or varies, in response to the reaction of the detector which is associated therewith, a mechanical stressing of the optical fiber.

3. A pressurized optical cable according to claim 1, wherein the optical fiber has an interruption at each location of detection, and each modification means includes a variable attenuator for shifting between two surfaces of the fiber resulting from the interruption, in response to the reaction of the detector associated therewith.

4. A pressurized optical cable according to claim 1, wherein said source means includes optical switching means for injecting into said end of the optical fiber a light signal for testing the pressurization of the cable, or anther light signal.

5. A pressurized optical cable according to claim 1, wherein the injected light signal contains in multiplexed form a signal for testing the pressurization of the cable and another signal, whereby the backscattered signal includes a portion corresponding to the testing signal, and wherein the echometry means are designed to generate a representation corresponding only to said portion.

6. A pressurized optical cable according to claim 1, wherein said cable includes a plurality of splices, said pressure detectors being respectively dispoded at said splices.

* * * * *